US007064333B2

(12) United States Patent
Torii

(10) Patent No.: US 7,064,333 B2
(45) Date of Patent: Jun. 20, 2006

(54) DIRECTION SENSITIVE DETECTOR OF RADIATION

(75) Inventor: Tatsuo Torii, Naka-gun (JP)

(73) Assignee: Japan Nuclear Cycle Development Institute, Ibaraki-Ken (JP)

( * ) Notice: Subject to any disclaimer, the term of this patent is extended or adjusted under 35 U.S.C. 154(b) by 0 days.

(21) Appl. No.: 10/877,979

(22) Filed: Jun. 29, 2004

(65) Prior Publication Data

US 2005/0082485 A1     Apr. 21, 2005

(30) Foreign Application Priority Data

Oct. 20, 2003   (JP)   ............................. 2003-359176

(51) Int. Cl.
    *G01T 1/20*   (2006.01)
(52) U.S. Cl. ..................................... 250/361
(58) Field of Classification Search ............. 250/336.1
    See application file for complete search history.

(56) References Cited

U.S. PATENT DOCUMENTS 5,780,856 A * 7/1998 Oka et al. .................... 250/367

2004/0218712 A1 * 11/2004 Jiang et al. .................... 378/19

FOREIGN PATENT DOCUMENTS

JP          9-15335         1/1997

* cited by examiner

*Primary Examiner*—David Porta
*Assistant Examiner*—Marcus Taningco
(74) *Attorney, Agent, or Firm*—Wenderoth, Lind & Ponack, L.L.P.

(57) ABSTRACT

An apparatus which is capable of detecting the incident direction of a radiation incident from afar and which is made to be small in size and light in weight is provided. The apparatus comprises a radiation detection system 12 having a scintillating optical fiber 10 converting an incident radiation into a light signal, light receiving elements 14a, 14b respectively connected to both ends of said scintillating optical fiber and converting the light signals propagating in two directions along said scintillating optical fiber into electric signals, and a radiation analysis system 16 deriving the incident position of the radiation on the basis of the difference between the arrival times of the electric signals from said light receiving elements. The scintillating optical fiber is arranged in a state of being curved in a circular arc shape, and a large number of flat collimators 18 are arranged on the outer periphery of the scintillating optical fiber in a radial pattern at nearly even intervals.

2 Claims, 4 Drawing Sheets

DIRECTION SENSITIVE DETECTOR OF RADIATION

FIELD OF THE INVENTION

The present invention relates to a direction sensitive detector of a radiation incident from afar, more specifically, an apparatus for detecting the incident direction of a radiation having a structure in which a scintillating optical. fiber is arranged in a state of being curved in a circular arc shape and a large number of flat collimators are arranged on the outer periphery of the scintillating optical fiber in a radial pattern at nearly even intervals. This technique is useful for such cases including the direction sensitive measurement of a radiation or the determination of a position of a radiation source for radioactivity emitted in a nuclear accident and the like.

BACKGROUND OF THE INVENTION

As an available technique for measuring radiation distribution, there is a radiation detection apparatus which includes a radiation detection system having a scintillating optical fiber converting an incident radiation to a light signal; light receiving elements respectively connected to both ends of the scintillating optical fiber and converting the light signals propagating in two directions along the scintillating optical fiber into electric signals; and a radiation analysis system deriving the incident position of the radiation on the basis of the difference between the arrival times of the electric signals from the two light receiving elements. Methods for obtaining two- or three-dimensional radiation distribution using this technique are disclosed, for example, in Japanese Patent Laid-open Specification No. 9-15335/1997 and the like.

For the purpose of measuring the positional distribution of a radiation in a satisfactory accuracy, a large number of detectors such as scintillating optical fibers small in diameter are bundled, and a photon-counting device including a large number of photomultipliers or position sensitive photomultipliers are connected to the rear ends of the detectors. In this constitution of the measurement apparatus, the photons emitted from the scintillators are counted, and thus, the measurement is conducted as to which scintillator the radiation has reached.

However, in the case where a radiation is incident from afar, the radiation comes to be a case of parallel incidence, so that it is impossible to determine the incident position and direction by merely using scintillating optical fibers. In this connection, there is considered an apparatus in which a large number of directional radiation detectors oriented in various directions are simultaneously arranged, but such an apparatus probably comes to be large in size and heavy in weight, and thus impractical.

SUMMARY OF THE INVENTION

The problems to be solved by the present invention include a problem such that the incident direction of a radiation incident from afar cannot be measured, and a problem such that the apparatus tends to be large in size and heavy in weight.

According to the present invention, there is provided a direction sensitive detector of a radiation comprising a radiation detection system having a scintillating optical fiber converting an incident radiation into a light signal; light receiving elements respectively connected to both ends of the scintillating optical fiber and converting the light signals propagating in two directions along the scintillating optical fiber into electric signals; and a radiation analysis system deriving the incident position of the radiation on the basis of the difference between the arrival times of the electric signals from the light receiving elements; wherein the scintillating optical fiber is arranged in a state of being curved in a circular arc shape, and a large number of flat collimators are arranged on the outer periphery of the scintillating optical fiber in a radial pattern at nearly even intervals.

In the present invention, it is preferable to form a constitution in which two sets of the radiation detection systems, each comprising a scintillating optical fiber and a large number of flat collimators, are arranged so as to cross each other at right angles at the centers thereof. A tough detector can be constructed by using, for example, a fiber guide provided with a structure having an outer surface curved in a semicircular shape and a groove formed along the outer surface, a large number of scintillating optical fibers being housed in the groove, and a large number of flat collimators being fixed to the outer surface of the fiber guide.

Since the detector of the present invention is provided with a structure having the radiation detection system in which, on the outer periphery of a scintillating optical fiber arranged in a state of being curved in a circular arc shape, a large number of flat collimators are arranged in a radial pattern at nearly even intervals, the incident direction measurement can be carried out even for radiations incident in parallel. Additionally, the collimators are simple in shape and can be made light in weight, the number of the necessary collimators is relatively small, the number of the necessary measurement electronic circuits constituting the radiation analysis system is small, and the detector of the present invention can thereby be fabricated at a low cost.

The use of the radiation detection system in which scintillating optical fibers are arranged in the two directions of X and Y makes it possible to measure the incident direction of a radiation in a two-dimensional manner. Additionally, the use of three or more such measurement apparatuses makes it possible to determine the position of the radiation source for radioactivity emitted in an accident and the like in a three-dimensional manner.

BRIEF DESCRIPTION OF THE DRAWINGS

FIG. 5 is a diagram illustrating another example of the direction sensitive detector of a radiation according to the present invention.

PREFERRED EMBODIMENTS OF THE INVENTION

In the radiation detection system of the present invention, at least one scintillating optical fiber is arranged in a state of being curved in a circular arc shape, and on the outer periphery of the fiber, a large number of flat collimators are arranged in a radial pattern at nearly even intervals. Only the radiation which passes through any of the gaps between the adjacent collimators can reach the scintillating optical fiber to be converted into a light signal. The incident position of the radiation on the scintillating optical fiber is derived from the arrival time difference between the electric signals from the two light receiving elements, and thus the incident direction of the radiation is detected. By providing a constitution in which two sets, each including a scintillating optical fiber and a large number of flat collimators, are arranged so as to cross each other at right angles at the centers thereof, the radiations from almost all the directions can be detected.

Figure 1:
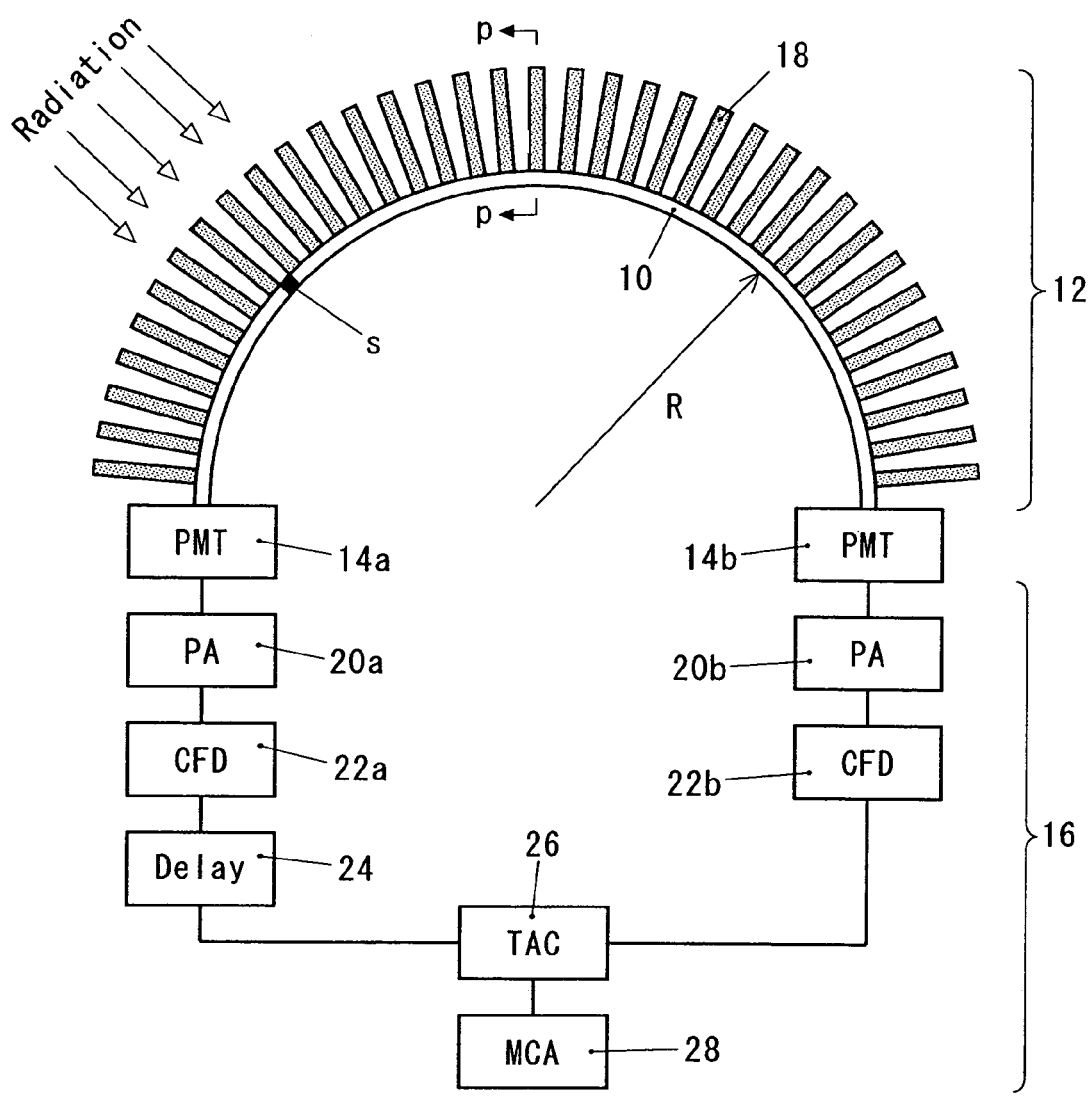
FIG. 1 is a diagram illustrating an example of the direction sensitive detector of a radiation according to the present invention.

FIG. 1 is a diagram illustrating an example of the direction sensitive detector of a radiation according to the present invention. This apparatus includes a radiation detection system 12 having at least one scintillating optical fiber 10 converting an incident radiation into a light pulse signal (scintillation light); light receiving elements 14a, 14b converting the respective light pulse signals, propagating in two directions (toward the two ends) in the scintillating optical fiber 10, into electric pulse signals; and a radiation analysis system 16 connected to the respective ends of the light receiving elements.

The radiation detection system 12 has a structure in which the scintillating optical fiber 10 is arranged in a state of being curved in a semicircular arc shape, and a large number of flat collimators 18 are arranged on the outer periphery of the scintillating optical fiber 10 in a radial pattern at nearly even intervals. As the scintillating optical fiber 10, a plastic scintillating optical fiber is preferable because the fiber is arranged easily in a state of being curved. As the flat collimators 18, lead plates are used. The radiation analysis system 16 adopts a time difference detection method in which the incident position of a radiation is determined on the basis of the arrival time difference between the electric pulse signals from the two light receiving elements 14a, 14b. The light receiving elements 14a, 14b are, for example, photomultiplier tubes (PMTs) and the like. The radiation analysis system 16 includes preamplifiers (PAs) 20a, 20b respectively connected to the light receiving elements 14a, 14b and constant fraction discriminators (CFDs) 22a, 22b respectively connected to the preamplifiers. One of the two outputs from the discriminators is input through a delay circuit (Delay) 24 into a time-to-amplitude converter (TAC) 26 and the other of the two outputs is directly input into the time-to-amplitude converter (TAC) 26, and both outputs from the time-to-amplitude converter are further input into a multichannel pulse height analyzer (MCA) 28.

Now, the operation of the apparatus will be described hereinbelow. When a radiation is incident in the scintillating optical fiber 10, scintillation light is generated in the scintillating optical fiber 10, and the light propagates as light pulse signals in the scintillating optical fiber 10 along two directions toward both ends of the fiber. In this connection, when a radiation is incident from afar, the radiation comes to be a case of parallel incidence. Therefore, the merely curved scintillating optical fiber possibly emits light from unspecified portions over a wide range of the fiber, with the result that the incident position and direction cannot be identified. On the contrary, in the present invention, since a large number of flat collimators 18 are arranged in a radial pattern at nearly even intervals on the outer periphery of the curved scintillating optical fiber 10, the radiation is incident in a division (the black division marked with the reference character "s" in FIG. 1), nearly perpendicular to the incident direction of the radiation, and a light pulse signal is generated in the division because the incident radiation can pass through the gap between the adjacent flat collimators. However, in divisions far away from the division concerned, light pulse signals are not generated because the incident radiations are shielded by the flat collimators. In such a way, depending upon the incident direction of the radiation, light emission occurs in a particular division along the lengthwise direction of the scintillating optical fiber 10, and thus there is a certain correlation between the incident direction of the radiation and the light emission position. Therefore, the measurement of the light emission position makes it possible to identify the incident direction of the radiation.

When the light pulse signals are input in the light receiving elements 14a, 14b respectively connected to the both ends of the fiber, the light pulse signals are converted into electric pulse signals. The electric pulse signals are amplified by the preamplifiers 20a, 20b, respectively, and then the wave forms of the pulse signals are shaped by the constant fraction discriminators 22a, 22b, respectively. One of the signals having been subjected to wave form shaping passes through the delay circuit 24 delaying the signal by a certain period of time and is then input into the time-to-amplitude converter 26, and the other of the signals is directly input into the time-to-amplitude converter 26, which outputs a signal having a pulse height in conformity with the arrival time difference between the two signals. Here, it should be noted that the insertion of the delay circuit 24 for one of the signals is made in order to ensure the delayed arrival at the time-to-amplitude converter 26 of the signal output from one of the constant fraction discriminators 22a with respect to the signal output from the other of the constant fraction discriminators 22b, irrespective of positions where the light emission occurs along the scintillating optical fiber 10.

Figure 2:
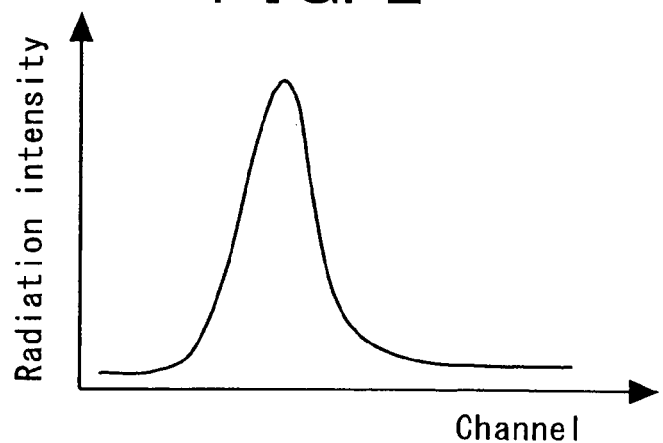
FIG. 2 is an example of an output of the multichannel pulse height analyzer in the detector of FIG. 1.

The output signal from the time-to-amplitude converter 26 is input into the multichannel pulse height analyzer 28 and the incident position of the radiation is identified on the basis of the pulse height of the output signal from the analyzer 28. An example of the output signal is shown in FIG. 2. The pulse height of the signal input into the multichannel pulse height analyzer 28 is proportional to the difference between the arrival times of the light pulse signals at the respective light receiving elements 14a, 14b. The arrival time difference corresponds to the incident position of the radiation along the scintillating optical fiber 10, and hence the multichannel pulse height analyzer 28 can identify the incident position of the radiation on the basis of the pulse height of the input signal. Such a measurement principle itself uses the time difference detection method well known in the art without modification.

In the present invention, as described above, since a large number of flat collimators 18 are arranged in a radial pattern at nearly even intervals on the outer periphery of the curved scintillating optical fiber 10, light emission occurs at a particular division along the lengthwise direction of the scintillating optical fiber 10 in compliance with the incident direction of the radiation. Thus, the light emitting position is measured as described above and the incident direction of the radiation is thereby identified. The resolution of the incident direction measurement can be regulated by the height, the width and the arrangement density of the flat collimators.

Figure 3:
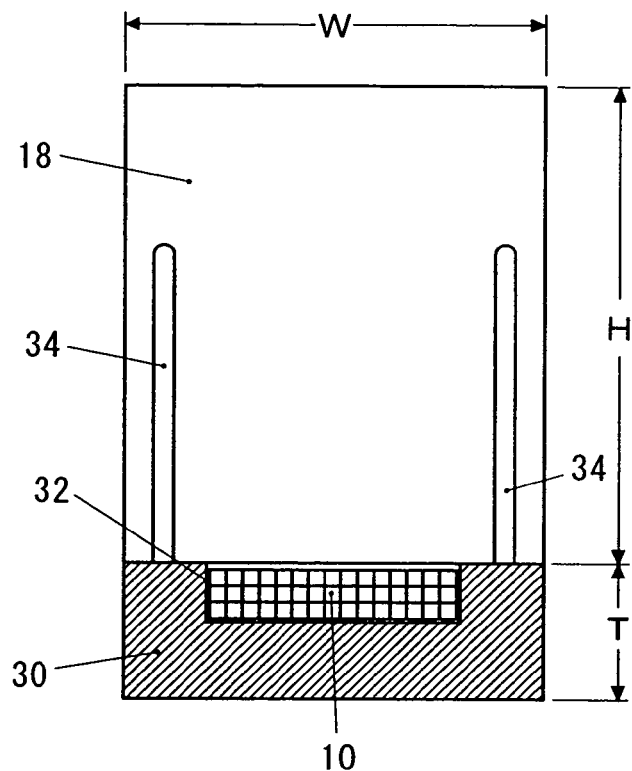
FIG. 3 illustrates the sectional view along the p-p position in FIG. 1.
Figure 4:
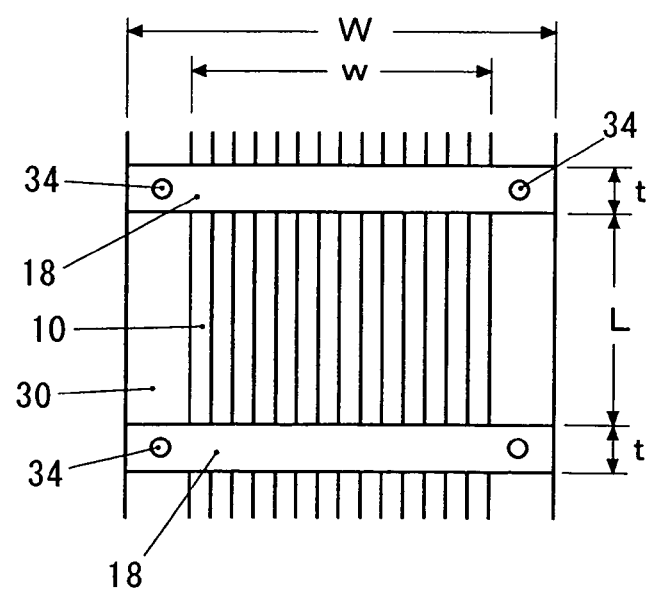
FIG. 4 is a plan view illustrating a portion of FIG. 1.

The specific structure of the radiation detection system 12 is illustrated in FIG. 3 and FIG. 4. FIG. 3 illustrates the sectional view in the p-p position in FIG. 1, and FIG. 4 illustrates a plan view of a portion of the system. A fiber guide 30 is used to hold a large number of scintillating optical fibers 10 in a state of being curved. The fiber guide 30 is an arc shaped member having a concave cross section and is provided with a structure having an outer surface curved in a semicircular shape and a groove 32 of a rectangular cross section formed along the outer surface. A large number of scintillating optical fibers 10 are housed in the groove 32 in such a way that the fibers are lined up in rows and laminated in plural layers. Supporting pins 34 are implanted along both sides of the fiber guide 30 at even intervals along the circumferential direction thereof and the flat collimators 18 are fixed by inserting and fitting the supporting pins 34 in the holes in the collimators 18. Thus, the radiation detection system provided with a tough structure can be fabricated.

There is shown below an example of a set of dimensions for the respective members of a prototype radiation detection system.

(1) Fiber guide (made of steel)
Radius of curvature R: approximately 300 mm
Width W: 50 mm
Groove width w: 30 mm
Thickness T: approximately 10 mm or more
Interval between flat collimators L: 20 mm (2) Flat collimator (made of lead)
Width W×height H×thickness t: 50 mm×60 mm×5 mm (3) Scintillating optical fiber (made of plastic doped scintillator)
Sectional shape×number of fibers×number of layers:
Square of 2 mm by 2 mm×15 fibers×3 layers (or 4 layers)

In the present invention, a large number of flat collimators 18 are arranged in a radial pattern at nearly even intervals on the outer periphery of the curved scintillating optical fiber 10, and hence the shielding thickness of the flat collimators 18 is increased with increasing incident angle of the radiation with respect to the scintillating optical fiber 10, so that the radiation smaller in incident angle (near the direction normal to the fiber) can be made to have a higher sensitivity. Additionally, the thickness of each flat collimator can be made relatively small, so that the weight reduction of the collimators can be achieved.

Figure 5A:
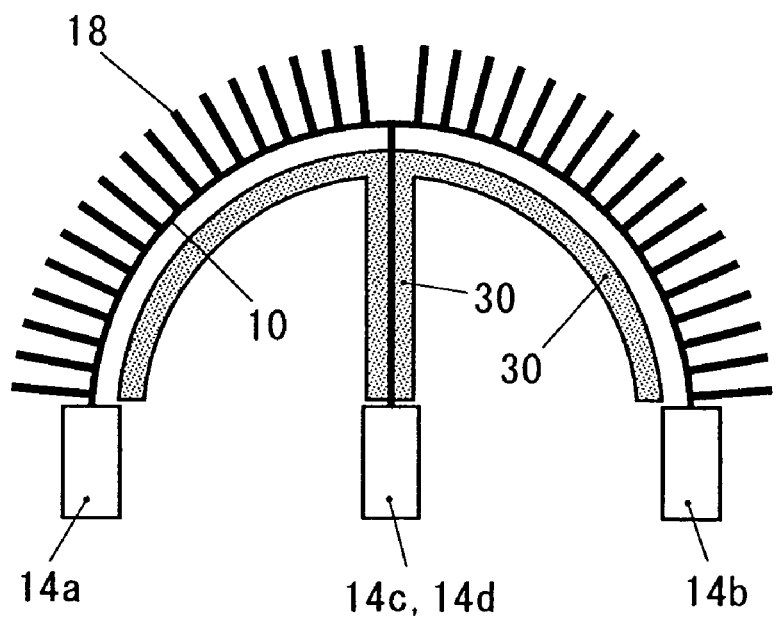
FIG. 5A illustrates a front view and FIG. 5B illustrates a plan view of the detector.
Figure 5B:
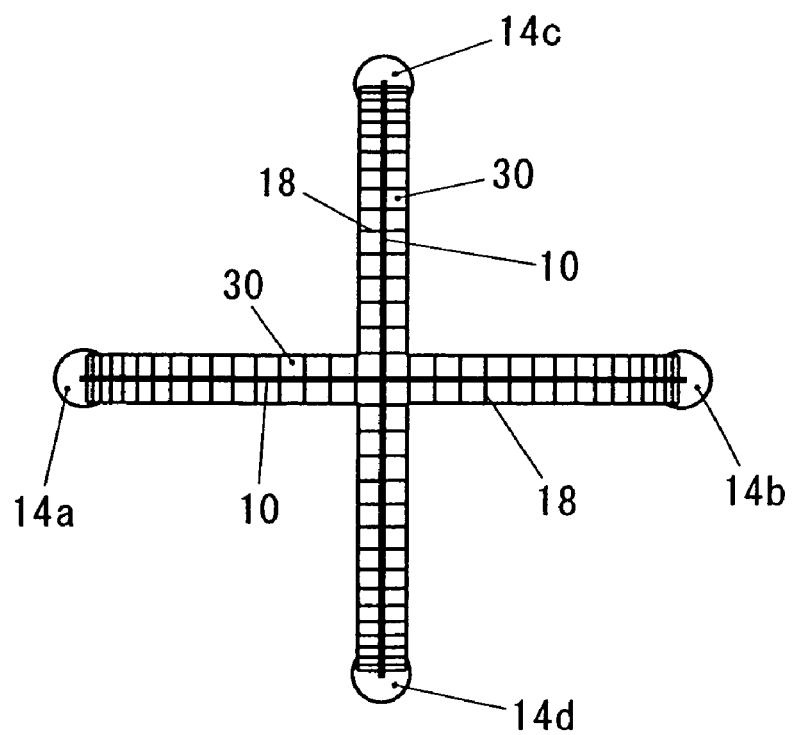

FIG. 5 is a diagram illustrating another example of the radiation detection system, in which FIG. 5A illustrates a front view and FIG. 5B illustrates a plan view of the system. In this example, two sets of the radiation detection systems, each comprising a scintillating optical fiber 10 and a large number of flat collimators 18, are arranged as the X-side and Y-side systems so as to cross each other at right angles at the centers thereof. Also in this case, the scintillating optical fiber 10 and the flat collimators 18 for each of the X-side and Y-side systems are supported by the fiber guide 30, substantially similar to FIG. 3 and FIG. 4. Light receiving elements 14a, 14b, 14c and 14d are respectively connected to both ends of the scintillating optical fibers 10, and convert the light pulse signals arriving at the respective light receiving elements into electric pulse signals. Consequently, although not shown in these figures, two sets of radiation analysis systems are provided respectively for the X-side and Y-side radiation detection systems.

Figure 6:
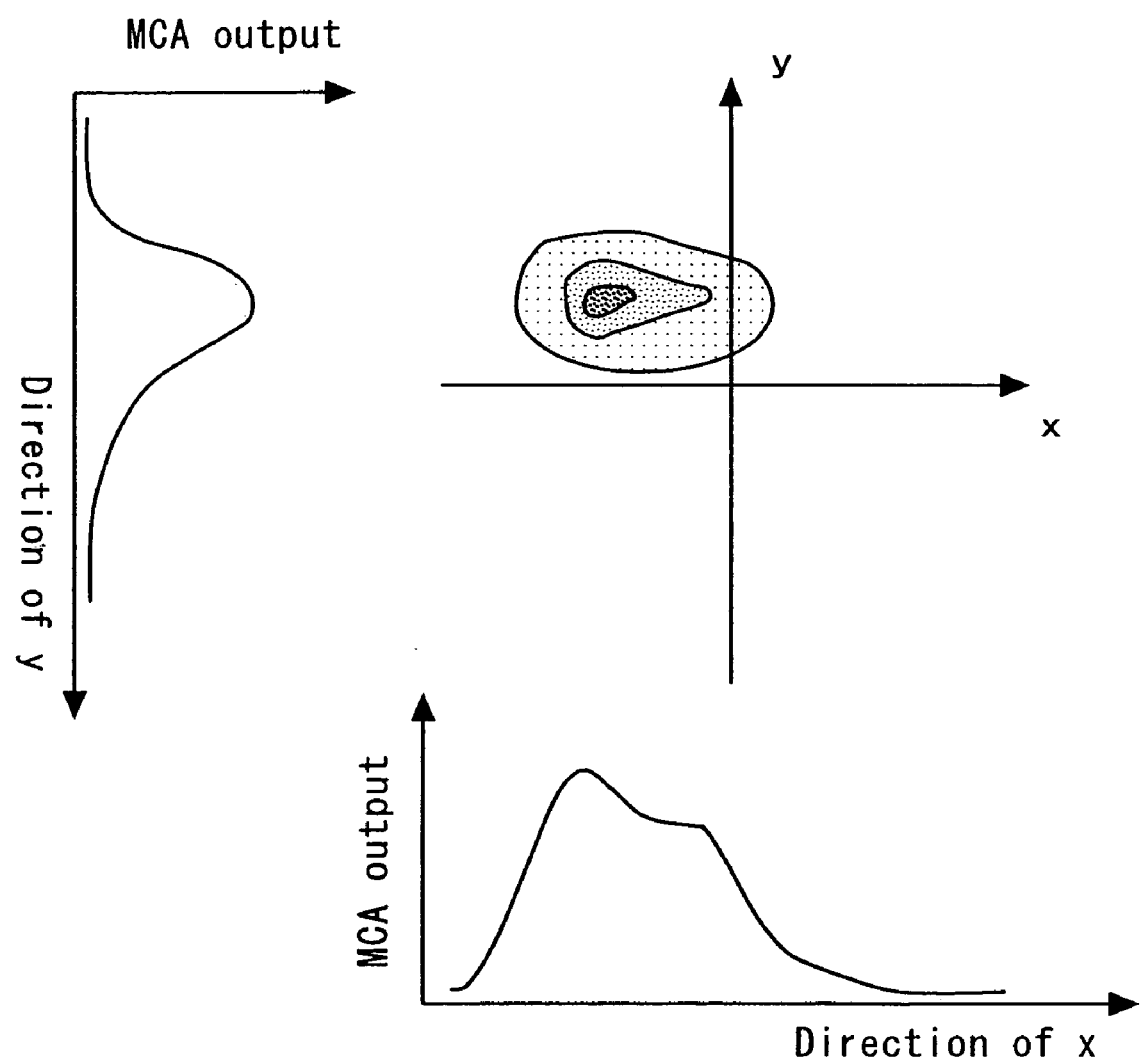
FIG. 6 shows graphs describing a measurement result based on the detector of FIG. 5.

In such a configuration as described above, the detection of the radiation incident directions along the two directions, namely, X and Y directions comes to be possible. An example of a measurement result is shown in FIG. 6. The radiation intensity was measured with each of the X-side and Y-side systems, and by synthesizing the respective measurement results, a two-dimensional distribution (the contour map of the MCA output) can be obtained. On the basis of the distribution, the incident direction of the radiation can be detected. Accordingly, by installing three or more such direction sensitive detector of the radiation at locations away from each other and by carrying out measurements using these detecotrs, it comes to be possible-to identify the location of a radiation source in a three-dimensional manner.

What is claimed is:

1. A direction sensitive detector for measuring radiation from afar, comprising:
   a first radiation detection system including:
      a first scintillating optical fiber having a curved circular arc shape and being operable to convert incident radiation into a light signal; and
      a plurality of flat collimators substantially evenly spaced apart on an outer periphery of said scintillating optical fiber in a radial pattern;
   light receiving elements respectively connected to each end of said scintillating optical fiber and operable to convert the light signal propagating in two directions along said scintillating optical fiber into electric signals; and
   a radiation analysis system operable to derive an incident position of the radiation based on a difference between arrival times of the electric signals from said light receiving elements;
   a second radiation detection system including:
      a second arc-shaped scintillating optical fiber; and
      a plurality of flat collimators substantially evenly spaced apart on an outer periphery of said second scintillating optical fiber in a radial pattern, said second radiation detection system being arranged so that a center of said second radiation detection system crosses a center of said first radiation detection system at a right angle; and
   wherein each of said first radiation detection system and said second radiation detection system further includes a fiber guide having an outer surface curved in a semicircular shape and a groove formed along said outer surface, a plurality of scintillating optical fibers being housed in said groove, and a plurality of flat collimators being fixed to said outer surface of said fiber guide.

2. A direction sensitive detector for measuring radiation from afar, comprising:
   a radiation detection system including:
      a scintillating optical fiber having a curved circular arc shape and being operable to convert incident radiation into a light signal; and
      a plurality of flat collimators substantially evenly spaced apart on an outer periphery of said scintillating optical fiber in a radial pattern;
   light receiving elements respectively connected to each end of said scintillating optical fiber and operable to convert the light signal propagating in two directions along said scintillating optical fiber into electric signals; and
   a radiation analysis system operable to derive an incident position of the radiation based on a difference between arrival times of the electric signals from said light receiving elements;
   wherein said radiation detection system further includes a fiber guide having an outer surface curved in a semicircular shape and a groove formed along said outer surface, a plurality of scintillating optical fibers being housed in said groove, and a plurality of flat collimators being fixed to said outer surface of said fiber guide.

* * * * *